United States Patent
Yamashita et al.

(10) Patent No.: US 11,302,994 B2
(45) Date of Patent: Apr. 12, 2022

(54) METHOD FOR PRODUCING MONO-CELL

(71) Applicant: Envision AESC Japan Ltd., Zama (JP)

(72) Inventors: Takeshi Yamashita, Kanagawa (JP);
Takanori Satou, Kanagawa (JP);
Kenichi Shirai, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 115 days.

(21) Appl. No.: 16/488,796

(22) PCT Filed: Feb. 27, 2017

(86) PCT No.: PCT/JP2017/007467
§ 371 (c)(1),
(2) Date: Aug. 26, 2019

(87) PCT Pub. No.: WO2018/154776
PCT Pub. Date: Aug. 30, 2018

(65) Prior Publication Data
US 2020/0067051 A1  Feb. 27, 2020

(51) Int. Cl.
*H01M 2/16* (2006.01)
*H01M 10/0585* (2010.01)
(Continued)

(52) U.S. Cl.
CPC ..... *H01M 50/461* (2021.01); *H01M 10/0585* (2013.01); *H01M 10/0404* (2013.01); *H01M 2004/028* (2013.01)

(58) Field of Classification Search
CPC .............. H01M 50/461; H01M 50/46; H01M 10/0585; H01M 10/0413; H01M 10/052;
(Continued)

(56) References Cited

U.S. PATENT DOCUMENTS

2014/0020235 A1* 1/2014 Aramaki ........... H01M 10/0525
29/593
2014/0377631 A1   12/2014 Park et al.
(Continued)

FOREIGN PATENT DOCUMENTS

EP          2696422 A1   2/2014
JP       2005285583 A   10/2005
(Continued)

*Primary Examiner* — Matthew W Van Oudenaren
(74) *Attorney, Agent, or Firm* — Young Basile Hanlon & MacFarlane, P.C.

(57) ABSTRACT

In producing a mono-cell, the mono-cell is formed from separator, positive electrode, separator and negative electrode which are joined to each other. Negative electrode is joined, one by one, to one surface of strip of continuously conveyed separator. Positive electrode having different size from negative electrode is joined, one by one, to the other surface of separator. Strip of continuously conveyed second separator is joined to one of negative and positive electrodes. Position of negative electrode joined to separator is detected by negative electrode joining position detection cameras, and joining position of positive electrode is corrected by positive electrode alignment mechanism with this detected position of negative electrode being a reference during conveyance of positive electrode along positive electrode conveyance direction.

7 Claims, 4 Drawing Sheets

(51) Int. Cl.
*H01M 50/46* (2021.01)
*H01M 4/02* (2006.01)
*H01M 10/04* (2006.01)

(58) Field of Classification Search
CPC ......... H01M 10/0463; H01M 10/0404; H01M 10/0436; H01M 2004/028
See application file for complete search history.

(56) References Cited

U.S. PATENT DOCUMENTS

| | | | |
|---|---|---|---|
| 2015/0033547 A1* | 2/2015 | Yang | ................... H01M 4/0402 29/623.4 |
| 2015/0209054 A1 | 7/2015 | Atabey | |

FOREIGN PATENT DOCUMENTS

| | | | |
|---|---|---|---|
| JP | 2011246212 | A | 12/2011 |
| JP | 2015528629 | A | 9/2015 |
| JP | 2015529957 | A | 10/2015 |
| JP | 2015197977 | A | 11/2015 |
| KR | 20100113111 | A | 10/2010 |

* cited by examiner

METHOD FOR PRODUCING MONO-CELL

TECHNICAL FIELD

The present invention relates to a method for producing a mono-cell formed by alternately stacking separators and electrodes.

BACKGROUND

Japanese Translation of PCT Internal Application Publication No. 2015-529957 discloses a method for producing a base stacking unit (a radical unit) that constitutes an electrode stacking unit used for a secondary battery. According to this method, the base stacking unit is formed by alternately stacking a pair of electrodes, each of which has been cut into a certain shape, on a pair of long strips of separator, attaching these four members to each other and cutting the pair of separators at once by a cutter.

It is very difficult to stack the pair of electrodes with one of the pair of electrodes being aligned with a position of the other electrode through the strips of separator. In a case of the producing method of the Japanese Translation of PCT Internal Application Publication No. 2015-529957, the electrodes are stacked on the separators with positions of the electrodes remaining unchanged at a setting reference position without being aligned. Therefore, this brings a problem of occurrence of variation in a relative position between the pair of electrodes.

SUMMARY

According to a mono-cell producing method of the present invention, a first electrode is joined, one by one, to one surface of a strip of first separator, a second electrode having a different size from that of the first electrode is joined, one by one, to the other surface of the first separator, and a strip of second separator is joined to one of the first electrode and the second electrode. A position of the first electrode is detected at an upstream side or a downstream side of a joining point of the second electrode, and a joining position of the second electrode upon being joined to the first separator is corrected with the detected position of the first electrode being a reference.

According to the present invention, since the joining position of the second electrode is adjusted with the position of the first electrode being a reference, even though a pair of electrodes are stacked through the separator, it is possible to accurately harmonize the second electrode with the first electrode, and occurrence of variation in a relative position between the first electrode and the second electrode can be suppressed.

DETAILED DESCRIPTION

An embodiment of the present invention will be explained below with reference to the drawings.

Figure 1:
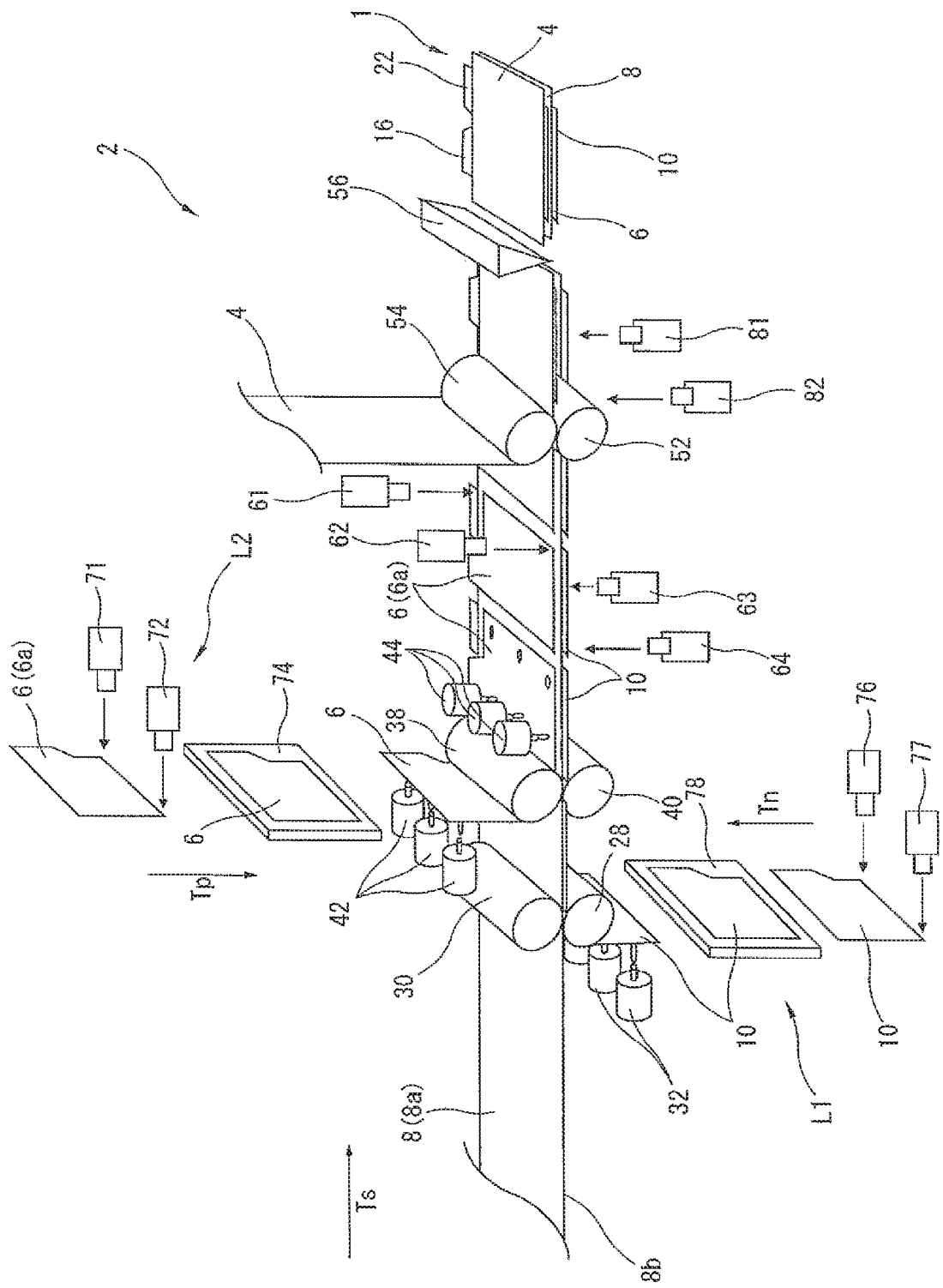
FIG. 1 is a perspective view of an electrode stacking device according to an embodiment.
Figure 2:
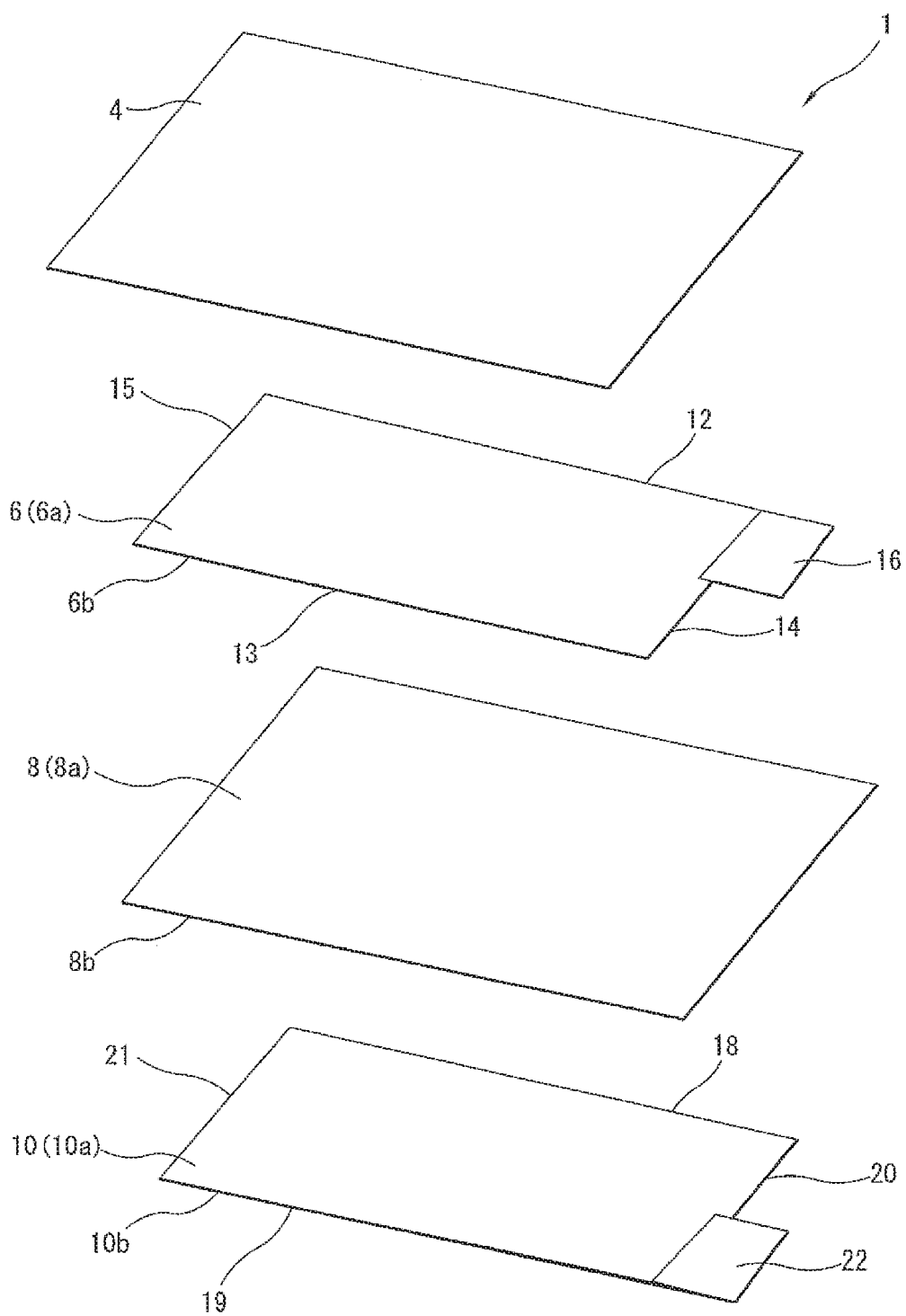
FIG. 2 is a perspective exploded view of a mono-cell.

FIG. 1 is a drawing schematically showing an electrode stacking device 2 that continuously produces a mono-cell 1 that will be a base stacking unit. FIG. 2 is a drawing schematically showing the mono-cell 1 produced by the electrode stacking device 2. In the following explanation, to facilitate the understanding, "up (or upper)" and "down (or lower)" of the mono-cell 1 and the electrode stacking device 2 are defined with their attitudes shown in FIGS. 1 and 2 being a reference.

As shown in FIG. 2, in the present embodiment, the mono-cell 1 has, in an order from an upper side, a sheet-shaped separator 4, a sheet-shaped positive electrode 6 as an electrode, a sheet-shaped separator 8 and a sheet-shaped negative electrode 10 as an electrode. By alternately joining or attaching these separators and electrodes, the mono-cell 1 is formed as an integral four-layer configuration.

The positive electrode 6 is formed into a sheet shape by binding an active material layer to both surfaces of a collector made of, e.g. aluminium. The positive electrode 6 has a pair of long edge portions 12 and 13 extending along long sides of a quadrangle and a pair of short edge portions 14 and 15 extending along short sides of the quadrangle. The positive electrode 6 is provided with a partly protruding positive electrode tab 16 at the short edge portion 14. This positive electrode tab 16 is positioned at one side of the short edge portion 14, and a side edge of the positive electrode tab 16 extends along or continues to the long edge portion 12.

The negative electrode 10 is formed into a sheet shape by binding an active material layer to both surfaces of a collector made of, e.g. copper. A size of the negative electrode 10 is slightly larger than that of the positive electrode 6. The negative electrode 10 has a pair of long edge portions 18 and 19 extending along long sides of a quadrangle and a pair of short edge portions 20 and 21 extending along short sides of the quadrangle. The negative electrode 10 is provided with a partly protruding negative electrode tab 22 at the short edge portion 20. This negative electrode tab 22 is positioned, on an opposite side to the positive electrode tab 16, at the short edge portion 20, and a side edge of the negative electrode tab 22 extends along or continues to the long edge portion 19.

The separators 4 and 8 electrically isolate or insulate the positive electrode 6 and the negative electrode 10 from each other, and also serve to hold electrolyte between the positive electrode 6 and the negative electrode 10. The separators 4 and 8 have the same configuration, and are formed into a quadrangular sheet shape with synthetic resin such as polyethylene and polypropylene. A size of these separators 4 and 8 is slightly larger than a quadrangular area except the negative electrode tab 22 of the negative electrode 10.

By stacking a plurality of such mono-cells 1 formed as described above, an electrode stacking unit, i.e. an electric power generation element, is formed. The electrode stacking unit is accommodated in a package made from a laminate film together with the electrolyte, then a film-packaged battery is formed.

As shown in FIG. 2, the electrode stacking device 2 continuously producing the mono-cell 1 has an adsorption drum 28 and a nip roller 30 for the negative electrode 10 which are arranged so as to face each other through the long strip of separator 8 extending in a longitudinal direction of the device 2. At an upstream side of this adsorption drum 28, a negative electrode dispenser 32 is provided so as to face the adsorption drum 28. The negative electrode dispenser 32 applies a dot (or dots) of an adhesive to an upper surface 10a of the negative electrode 10 which is conveyed to the device 2 through a negative electrode conveyance line L1 with the negative electrode 10 being previously cut into a predetermined shape. The adsorption drum 28 carries the negative electrode 10 while adsorbing the negative electrode 10, and stacks the negative electrode 10 on a lower surface 8b of the separator 8 one by one. The nip roller 30 presses these negative electrode 10 and separator 8, which have been stacked each other, against the adsorption drum 28, thereby joining or attaching the negative electrode 10 to the separator 8.

At a downstream side of the nip roller 30, an adsorption drum 38 for the positive electrode 6 and a nip roller 40 arranged at a lower side of the adsorption drum 38 through the separator 8, a positive electrode first dispenser 42 provided so as to face the adsorption drum 38 and a positive electrode second dispenser 44 provided at a downstream side of the adsorption drum 38 are set. The positive electrode first dispenser 42 applies a dot (or dots) of an adhesive to a lower surface 6b of the positive electrode 6 which is conveyed to the device 2 through a positive electrode conveyance line L2 with the positive electrode 6 being previously cut into a predetermined shape. The adsorption drum 38 carries the positive electrode 6 while adsorbing the positive electrode 6, and stacks the positive electrode 6 on an upper surface 8a of the separator 8 one by one so that the positive electrode 6 corresponds to (or is harmonized with) a position of the negative electrode 10 joined to the lower surface 8b of the separator 8. The nip roller 40 presses these negative electrode 10, separator 8 and positive electrode 6, which have been stacked each other, against the adsorption drum 38, thereby joining or attaching the positive electrode 6 to the upper surface 8a of the separator 8. The positive electrode second dispenser 44 applies a dot (or dots) of an adhesive to an upper surface 6a of the positive electrode 6 joined to the separator 8.

A conveyance roller 52 and a nip roller 54 are provided at a downstream side of the nip roller 40. The strip of separator 4 is then provided on the upper surface 6a of the positive electrode 6 through the nip roller 54. With this, four members of the negative electrode 10, the separator 8, the positive electrode 6 and the separator 4 are arranged in layers. A lower surface 4a of the separator 4 is joined to the positive electrode 6 with the adhesive applied by the positive electrode second dispenser 44.

A cutter 56 is provided at a downstream side of the nip roller 54. The cutter 56 cuts the separators 4 and 8 between adjacent two negative electrodes 10 and 10 at once. With this, the mono-cell 1 having a predetermined size is formed.

Here, in the present embodiment, as shown in FIG. 1, the positive electrode 6 and the negative electrode 10 are conveyed with the positive electrode tab 16 and the negative electrode tab 22 being positioned at a lateral side with respect to a separator conveyance direction Ts.

Further, at a downstream side of the positive electrode second dispenser 44, two positive electrode joining position detection cameras 61 and 62 that are located above the positive electrode 6 joined to the strip of separator 8 and detect a joining position of the positive electrode 6 and two negative electrode joining position detection cameras 63 and 64 that are located below the negative electrode 10 joined to the strip of separator 8 and detect a joining position of the negative electrode 10 are provided.

The positive electrode joining position detection cameras 61 and 62 have the substantially same configuration. The positive electrode joining position detection cameras 61 and 62 are arranged at positions where these cameras 61 and 62 are aligned along a width direction of the separator 8. One camera 61 is positioned at one short edge portion 14 side of the positive electrode 6, whereas the other camera 62 is positioned at the other short edge portion 15 side of the positive electrode 6. Each of the positive electrode joining position detection cameras 61 and 62 captures an image of the positive electrode 6 from above during conveyance of the positive electrode 6 along the separator conveyance direction Ts, and detects a position of the positive electrode 6 that is in a joined state to the separator 8.

Likewise, the negative electrode joining position detection cameras 63 and 64 has the substantially same configuration as the positive electrode joining position detection cameras 61 and 62. The negative electrode joining position detection cameras 63 and 64 are arranged at positions where these cameras 63 and 64 are aligned along the width direction of the separator 8. One camera 63 is positioned at one short edge portion 20 side of the negative electrode 10, whereas the other camera 64 is positioned at the other short edge portion 21 side of the negative electrode 10. Each of the negative electrode joining position detection cameras 63 and 64 captures an image of the negative electrode 10 from below during conveyance of the negative electrode 10 along the separator conveyance direction Ts, and detects a relative position of the negative electrode 10 to the separator 8.

Figure 3:
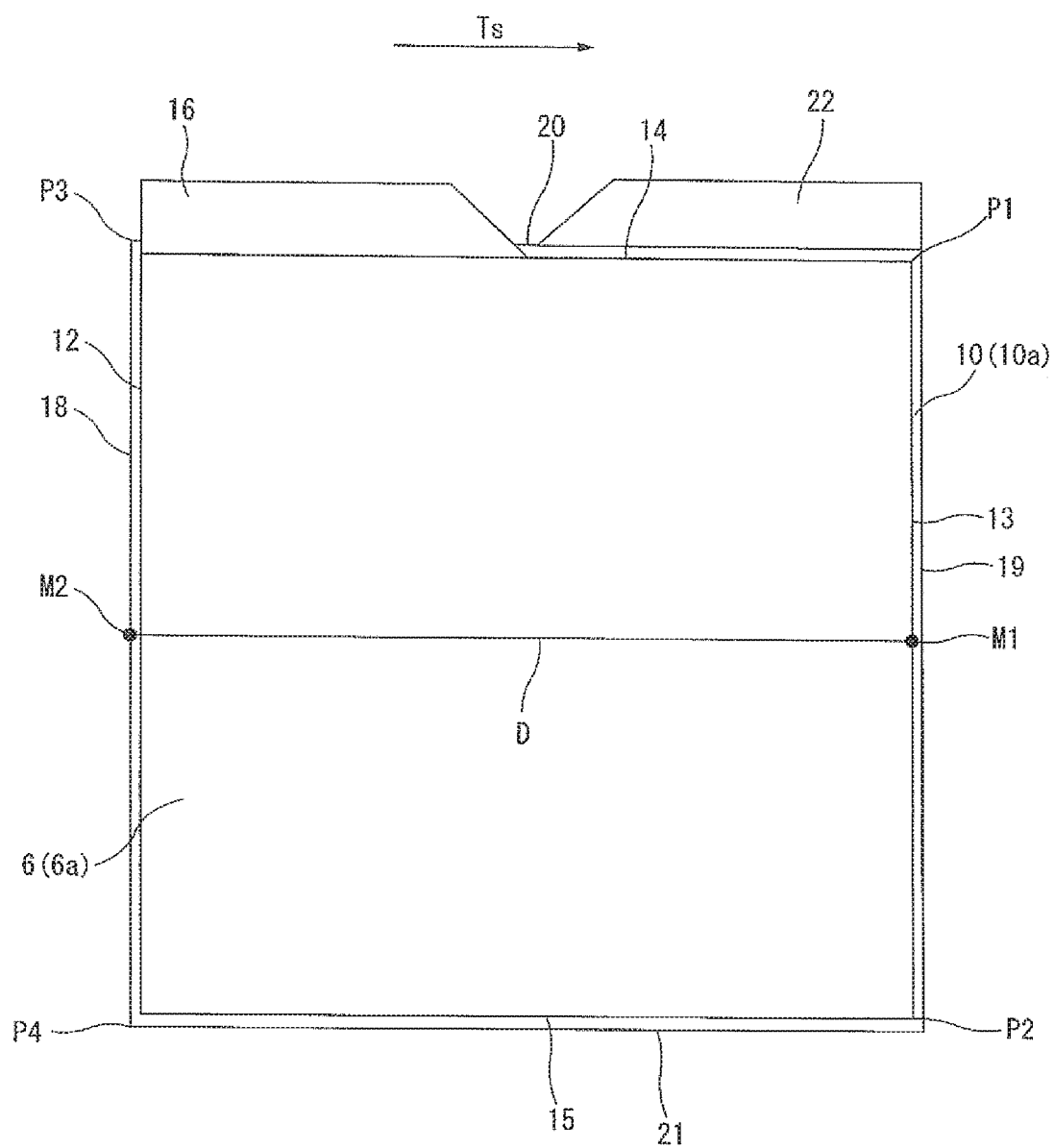
FIG. 3 is an explanatory drawing showing detection positions of positive and negative electrodes by joining position detection cameras.

FIG. 3 shows detection positions of the positive electrode 6 and the negative electrode 10 by the positive electrode joining position detection cameras 61 and 62 and the negative electrode joining position detection cameras 63 and 64. In FIG. 3, the separator 8 is omitted. The positive electrode 6 is stacked above the negative electrode 10 through the separator 8 (not shown), and the negative electrode 10, which is relatively larger than the positive electrode 6, slightly appears from a periphery of the positive electrode 6.

Here, for the sake of convenience in explanation, regarding the positive electrode 6, the long edge portion 12 which is located at an upstream side with respect to the separator conveyance direction Ts is defined as "upstream side long edge portion", and the long edge portion 13 which is located at a downstream side with respect to the separator conveyance direction Ts is defined as "downstream side long edge portion". Further, the short edge portion 14 which is located at a left side with respect to the separator conveyance direction Ts is defined as "left short edge portion", and the short edge portion 15 which is located at a right side with respect to the separator conveyance direction Ts is defined as "right short edge portion". Likewise, regarding the negative electrode 10, the long edge portion 18 which is located at an upstream side with respect to the separator conveyance direction Ts is defined as "upstream side long edge portion", and the long edge portion 19 which is located at a downstream side with respect to the separator conveyance direction Ts is defined as "downstream side long edge portion". Further, the short edge portion 20 which is located at a left side with respect to the separator conveyance direction Ts is defined as "left short edge portion", and the short edge portion 21 which is located at a right side with respect to the separator conveyance direction Ts is defined as "right short edge portion".

The positive electrode joining position detection cameras 61 and 62 detect two points P1 and P2 of the positive electrode 6 respectively which are positioned along the downstream side long edge portion 13 of the positive electrode 6 on an opposite side to the positive electrode tab 16. More specifically, the camera 61 detects the point P1 that is an apex of an angle (or a corner) formed by the downstream side long edge portion 13 and the left short edge portion 14. The camera 62 detects the point P2 that is an apex of an angle (or a corner) formed by the downstream side long edge portion 13 and the right short edge portion 15. These points P1 and P2 become a position reference of the positive electrode 6.

On the other hand, the negative electrode joining position detection cameras 63 and 64 detect two points P3 and P4 of the negative electrode 10 respectively which are positioned along the upstream side long edge portion 18 of the negative electrode 10 on an opposite side to the negative electrode tab 22. More specifically, the camera 63 detects the point P3 that is an apex of an angle (or a corner) formed by the upstream side long edge portion 18 and the left short edge portion 20. The camera 64 detects the point P4 that is an apex of an angle (or a corner) formed by the upstream side long edge portion 18 and the right short edge portion 21. These points P3 and P4 become a position reference of the negative electrode 10.

Each of the positive electrode joining position detection cameras 61 and 62 and the negative electrode joining position detection cameras 63 and 64 transmits a detection data to a control device (not shown). The control device judges a tendency of the joining position of the positive electrode 6 and a tendency of the joining position of the negative electrode 10 on the basis of the detection data transmitted from the cameras 61 to 64.

Further, as shown in FIG. 1, two positive electrode conveyance position detection cameras 71 and 72 are provided on the positive electrode conveyance line L2. Also, a positive electrode alignment mechanism 74 is provided at a downstream side of the positive electrode conveyance position detection cameras 71 and 72 on the positive electrode conveyance line L2.

Each of the positive electrode conveyance position detection cameras 71 and 72 captures an image of the positive electrode 6 during conveyance of the positive electrode 6 along a positive electrode conveyance direction Tp, and detects a conveyance position of the positive electrode 6 at a time when the positive electrode 6 is conveyed. More specifically, the positive electrode conveyance position detection cameras 71 and 72 detect the two points P1 and P2 of the corners of the downstream side long edge portion 13 of the positive electrode 6 respectively, which is the same as the positive electrode joining position detection cameras 61 and 62.

Figure 4:
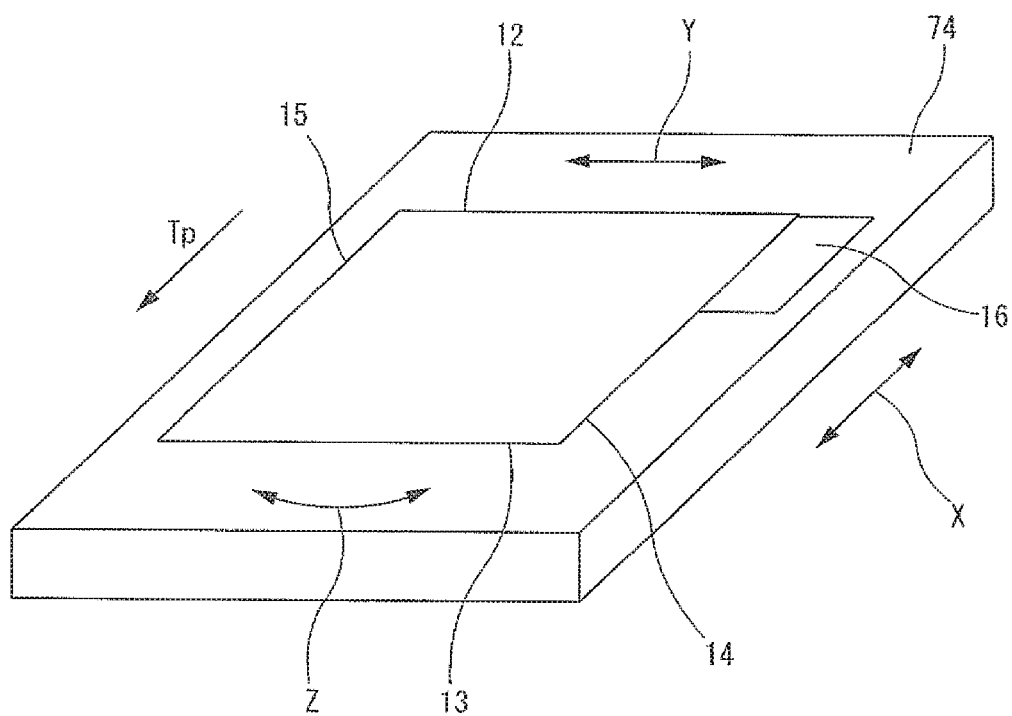
FIG. 4 is a perspective view of a positive electrode alignment mechanism.

FIG. 4 shows the positive electrode alignment mechanism 74. The positive electrode alignment mechanism 74 conveys the positive electrode 6, having passed by the positive electrode conveyance position detection cameras 71 and 72, toward the electrode stacking device 2. In addition, the positive electrode alignment mechanism 74 corrects the conveyance position of the positive electrode 6, namely the joining position when the positive electrode 6 is joined to the separator 8 (hereinafter, also called the joining position of the positive electrode 6) during this conveyance. The positive electrode alignment mechanism 74 is feedback-controlled by the control device (not shown). That is, the positive electrode alignment mechanism 74 corrects the joining position of the positive electrode 6 so as to be harmonized or identical with the tendency of the joining position of the negative electrode 10 with respect to the separator 8 which has been judged by the control device.

As shown in FIG. 4, the positive electrode alignment mechanism 74 corrects a conveyance direction position X along the positive electrode conveyance direction Tp of the positive electrode 6, a width direction position Y orthogonal to the positive electrode conveyance direction Tp of the positive electrode 6 and an orientation Z of the positive electrode 6. The conveyance direction position X of the positive electrode 6 is corrected by controlling a conveyance speed of the positive electrode 6. The width direction position Y of the positive electrode 6 is corrected by moving the positive electrode alignment mechanism 74 toward the left short edge portion 14 side or the right short edge portion 15 side of the positive electrode 6. The orientation Z of the positive electrode 6 is corrected by making a difference in conveyance speed between the left short edge portion 14 side and the right short edge portion 15 side of the positive electrode 6.

Likewise, as shown in FIG. 1, two negative electrode conveyance position detection cameras 76 and 77, which detect a position of the negative electrode 10 at a time when the negative electrode 10 is conveyed, are provided on the negative electrode conveyance line L1. Also, a negative electrode alignment mechanism 78 is provided at a downstream side of the negative electrode conveyance position detection cameras 76 and 77 on the negative electrode conveyance line L1.

Each of the negative electrode conveyance position detection cameras 76 and 77 captures an image of the negative electrode 10 during conveyance of the negative electrode 10 along a negative electrode conveyance direction Tn, and detects the conveyance position of the negative electrode 10 at a time when the negative electrode 10 is conveyed. More specifically, the negative electrode conveyance position detection cameras 76 and 77 detect the two points P3 and P4 of the corners of the upstream side long edge portion 18 of the negative electrode 10 respectively, which is the same as the negative electrode joining position detection cameras 63 and 64.

The negative electrode alignment mechanism 78 conveys the negative electrode 10, having passed by the negative electrode conveyance position detection cameras 76 and 77, toward the electrode stacking device 2. In addition, the negative electrode alignment mechanism 78 corrects the conveyance position of the negative electrode 10, namely the joining position of the negative electrode 10 with respect to the separator 8 during this conveyance. The negative electrode alignment mechanism 78 corrects the joining position of the negative electrode 10 so as to be harmonized or identical with a reference position of a facility side (a device side). In the same manner as the positive electrode alignment mechanism 74, the negative electrode alignment mechanism 78 corrects a conveyance direction position along the negative electrode conveyance direction Tn of the negative electrode 10, a width direction position orthogonal to the negative electrode conveyance direction Tn of the negative electrode 10 and an orientation of the negative electrode 10.

Further, two cut position detection cameras 81 and 82 are provided below the negative electrode 10 at a downstream side of the conveyance roller 52 and an upstream side of the cutter 56. The cut position detection cameras 81 and 82 have the substantially same configuration. The cut position detection cameras 81 and 82 are arranged at positions where these cameras 81 and 82 are aligned along the width direction of the separator 8. Each of the cut position detection cameras 81 and 82 captures an image of the negative electrode 10 from below during conveyance of the negative electrode 10 along the separator conveyance direction Ts after the four members of the negative electrode 10, the separator 8, the positive electrode 6 and the separator 4 are joined to each other, and detects each relative position of the negative electrode 10 to the separator 8. That is, in the same manner as the negative electrode joining position detection cameras 63 and 64, the cut position detection cameras 81 and 82 detect two points P3 and P4 of the corners of the upstream side long edge portion 18 of the negative electrode 10 respectively. Detection results by the cut position detection cameras 81 and 82 are used for correction of a cut position by the cutter 56.

Next, correction of the joining position of the positive electrode 6 will be explained with reference to FIGS. 1, 3 and 4.

As shown in FIG. 1, the negative electrode 10 is conveyed along the negative electrode conveyance direction Tn, and joined to the lower surface 8b of the separator 8 so as to be identical or match up with the device side reference position. On the other hand, the positive electrode 6 is conveyed along the positive electrode conveyance direction Tp, and stacked on the upper surface 8a of the separator 8 one by one after the conveyance positions of the positive electrode 6, i.e. the points P1 and P2 of the positive electrode 6, are detected during conveyance by the positive electrode conveyance position detection cameras 71 and 72.

After the three members of the positive electrode 6, the separator 8 and the negative electrode 10 are joined to each other, the joining positions of the positive electrode 6, i.e. the points P1 and P2 of the positive electrode 6, are detected by the positive electrode joining position detection cameras 61 and 62, and the joining positions of the negative electrode 10, i.e. the points P3 and P4 of the negative electrode 10, are detected by the negative electrode joining position detection cameras 63 and 64. Each of the cameras 61, 62, 63 to 64 transmits the detection data to the control device (not shown).

The control device determines, on the basis of the transmitted detection data, the tendency of the joining position of the negative electrode 10 and the tendency of the joining position of the positive electrode 6 which are each joined to the strip of separator 8 one by one, and judges whether or not the tendency of the joining position of the positive electrode 6 is identical or matches up with the tendency of the joining position of the negative electrode 10. If the tendency of the joining position of the positive electrode 6 does not match up with the tendency of the joining position of the negative electrode 10, i.e. if there is a position deviation between the negative electrode 10 and the positive electrode 6, the control device compares positions of the points P1 and P2 of the positive electrode 6 upon being joined which are detected by the positive electrode joining position detection cameras 61 and 62 and positions of the points P1 and P2 of the positive electrode 6 before being joined which are detected by the positive electrode conveyance position detection cameras 71 and 72, and fixes a correction amount of the joining position of the positive electrode 6. The control device then sends its result as feedback to the positive electrode alignment mechanism 74.

The positive electrode alignment mechanism 74 corrects the joining position of the positive electrode 6 during conveyance of the positive electrode 6 along the positive electrode conveyance direction Tp so as to be harmonized or identical with the tendency of the joining position of the negative electrode 10 on the basis of the feedback by the control device.

For example, if there is a tendency for the negative electrode 10 to be joined to the separator 8 with a deviation from the device side reference position toward an upstream side or a downstream side in the separator conveyance direction Ts occurring and also this tendency of the negative electrode 10 and the tendency of the joining position of the positive electrode 6 do not match up with each other, i.e. if the position deviation between the negative electrode 10 and the positive electrode 6 in the separator conveyance direction Ts occurs, the positive electrode alignment mechanism 74 corrects the conveyance direction position X of the positive electrode 6 so that the position of the positive electrode 6 matches up with the position of the negative electrode 10.

The position deviation between the negative electrode 10 and the positive electrode 6 in the separator conveyance direction Ts is judged by a distance between the two points P3 and P4 of the negative electrode 10 and the two points P1 and P2 of the positive electrode 6. More specifically, as shown in FIG. 3, a judgment is made as to whether or not a distance D between a midpoint M1 between the points P1 and P2 and a midpoint M2 between the points P3 and P4 is within a reference value. If the distance D between the midpoint M1 and the midpoint M2 is greater than the reference value, the positive electrode alignment mechanism 74 corrects the conveyance direction position X of the positive electrode 6 by decreasing the conveyance speed of the positive electrode 6. If the distance D between the midpoint M1 and the midpoint M2 is smaller than the reference value, the positive electrode alignment mechanism 74 corrects the conveyance direction position X of the positive electrode 6 by increasing the conveyance speed of the positive electrode 6. By correcting the conveyance direction position X of the positive electrode 6 in this manner, the positive electrode 6 is placed in the substantially middle of the negative electrode 10 that is relatively slightly larger than the positive electrode 6.

On the other hand, if there is a tendency for the negative electrode 10 to be joined to the separator 8 with a deviation from the device side reference position in a width direction of the separator 8 occurring and also this tendency of the negative electrode 10 and the tendency of the joining position of the positive electrode 6 do not match up with each other, i.e. if the position deviation between the negative electrode 10 and the positive electrode 6 in the width direction of the separator 8 occurs, the positive electrode alignment mechanism 74 corrects the width direction position Y of the positive electrode 6 so that the position of the positive electrode 6 matches up with the position of the negative electrode 10.

The position deviation between the negative electrode 10 and the positive electrode 6 in the width direction of the separator 8 is judged by a position of the point P1 of the positive electrode 6 with respect to the point P3 of the negative electrode 10 and a position of the point P2 of the positive electrode 6 with respect to the point P4 of the negative electrode 10. If the negative electrode 10 is joined to the separator 8 with a deviation from the device side reference position to the left short edge portion 20 side occurring, the positive electrode alignment mechanism 74 corrects the width direction position Y of the positive electrode 6 by moving (by movement of the positive electrode alignment mechanism 74) toward the left short edge portion 14 side in the width direction. On the other hand, if the negative electrode 10 is joined to the separator 8 with a deviation from the device side reference position to the right short edge portion 21 side occurring, the positive electrode alignment mechanism 74 corrects the width direction position Y of the positive electrode 6 by moving (by movement of the positive electrode alignment mechanism 74) toward the right short edge portion 15 side in the width direction. By correcting the width direction position Y of the positive electrode 6 in this manner, the positive electrode 6 is placed in the substantially middle of the negative electrode 10 that is relatively slightly larger than the positive electrode 6.

Further, if there is a tendency for the negative electrode 10 to be joined to the separator 8 at a certain angle with respect to the separator 8 and also this tendency of the negative electrode 10 and the tendency of the joining position of the positive electrode 6 do not match up with each other, the positive electrode alignment mechanism 74 corrects the orientation Z of the positive electrode 6 so that the position of the positive electrode 6 matches up with the position of the negative electrode 10.

The deviation between the orientation of the negative electrode 10 and the orientation of the positive electrode 6 is judged by an orientation of the points P1 and P2 of the positive electrode 6 with respect to the points P3 and P4 of the negative electrode 10, i.e. by an orientation of the downstream side long edge portion 13 of the positive electrode 6 with respect to the upstream side long edge portion 18 of the negative electrode 10. The positive electrode alignment mechanism 74 corrects the orientation Z of the positive electrode 6 by making a difference in conveyance speed between the left short edge portion 14 side and the right short edge portion 15 side of the positive electrode 6. By correcting the orientation Z of the positive electrode 6 in this manner, the edge portions 12, 13, 14 and 15 become substantially parallel to the edge portions 18, 19, 20 and 21 respectively.

As described above, by correcting the joining position of the positive electrode 6 upon being joined to the separator 8 with the joining position of the negative electrode 10 being a reference and then joining the positive electrode 6 to the separator 8, even though the negative electrode 10 and the positive electrode 6 are stacked through the separator 8, the position of the negative electrode 10 and the position of the positive electrode 6 can match up with each other, and occurrence of variation in a relative position between the negative electrode 10 and the positive electrode 6 can be suppressed.

Here, in the above embodiment, in a case where the negative electrode 10 conveyed along the negative electrode conveyance direction Tn does not match up with the device side reference position, the position of the negative electrode 10 can be corrected by the negative electrode alignment mechanism 78.

Although one embodiment of the present invention has been explained above, the present invention is not limited to the above embodiment, and a variety of modifications could be possible.

In the above embodiment, the position of the negative electrode 10 with respect to the separator 8 is detected at a downstream side of a joining point of the positive electrode 6. However, the position of the negative electrode 10 with respect to the separator 8 could be detected at an upstream side of the joining point of the positive electrode 6.

Further, in the above embodiment, the position at which the positive electrode 6 is actually joined to the separator 8, i.e. the points P1 and P2 of the positive electrode 6, are detected together with the position of the negative electrode 10, i.e. the points P3 and P4 of the negative electrode 10, and harmonization or matching of the both positions of the negative electrode 10 and the positive electrode 6 is judged, then the correction of the joining position of the positive electrode 6 is carried out. However, the correction of the joining position of the positive electrode 6 could be carried out on the basis of the detection position of the negative electrode 10 without detecting a final joining position of the positive electrode 6.

In the above embodiment, although the mono-cell 1 is formed as the integral four-layer configuration that is formed by the separator 4, the positive electrode 6, the separator 8 and the negative electrode 10, the mono-cell 1 could be formed as a three-layer configuration. Also in this case, the present invention can be applied to this mono-cell.

The invention claimed is:

1. A method for producing a mono-cell formed by alternately stacking separators and electrodes, wherein a first electrode previously cut into a predetermined shape is joined, one by one, to one surface of a strip of continuously conveyed first separator, a second electrode previously cut into a predetermined shape and having a different size from that of the first electrode is joined, one by one, to the other surface of the first separator, a strip of continuously conveyed second separator is joined to one of the first electrode and the second electrode, and the stacked first and second separators are cut between adjacent first electrodes, the method comprising:
   detecting a position of the first electrode at an upstream side or a downstream side of a joining point of the second electrode; and
   correcting a joining position of the second electrode upon being joined to the first separator with the detected position of the first electrode being a reference.

2. The method for producing the mono-cell as claimed in claim 1, wherein:
   the detection of the position of the first electrode is carried out by detecting two points of the first electrode which are positioned along an upstream side edge portion or a downstream side edge portion in a conveyance direction of the first electrode.

3. The method for producing the mono-cell as claimed in claim 1, wherein:
   the first electrode has a tab partly protruding to a lateral side with respect to a conveyance direction of the first electrode, and the tab continues to one of an upstream side edge portion or a downstream side edge portion in the conveyance direction of the first electrode, and
   the detection of the position of the first electrode is carried out by detecting two points of the first electrode which are positioned at corners of the upstream side edge portion or the downstream side edge portion on an opposite side to the tab.

4. The method for producing the mono-cell as claimed in claim 1, wherein:
   the joining position of the second electrode is corrected in a direction along a conveyance direction of the first separator so as to correspond to the position of the first electrode.

5. The method for producing the mono-cell as claimed in claim 1, wherein:
   the joining position of the second electrode is corrected in a direction orthogonal to a conveyance direction of the first separator so as to correspond to the position of the first electrode.

6. The method for producing the mono-cell as claimed in claim 1, wherein:
   an orientation of the second electrode with respect to the first separator is corrected so as to correspond to an orientation of the first electrode with respect to the first separator when joining the second electrode to the first separator.

7. The method for producing the mono-cell as claimed in claim 1, wherein:
   the position of the first electrode with respect to the first separator is detected, and a cut position of the first and second separators is corrected on the basis of the detected position of the first electrode.

* * * * *